Nov. 8, 1955
W. A. MOREY
2,722,897
RAILWAY VEHICLE COUPLING DEVICE
Filed Oct. 28, 1952
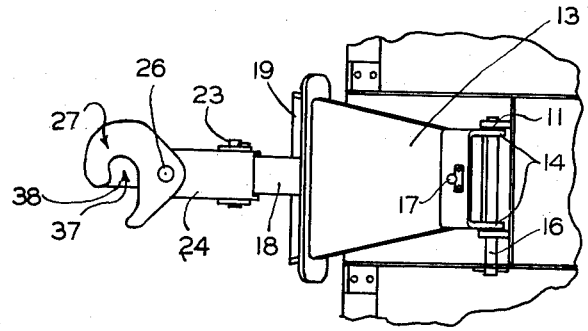
FIG. 1
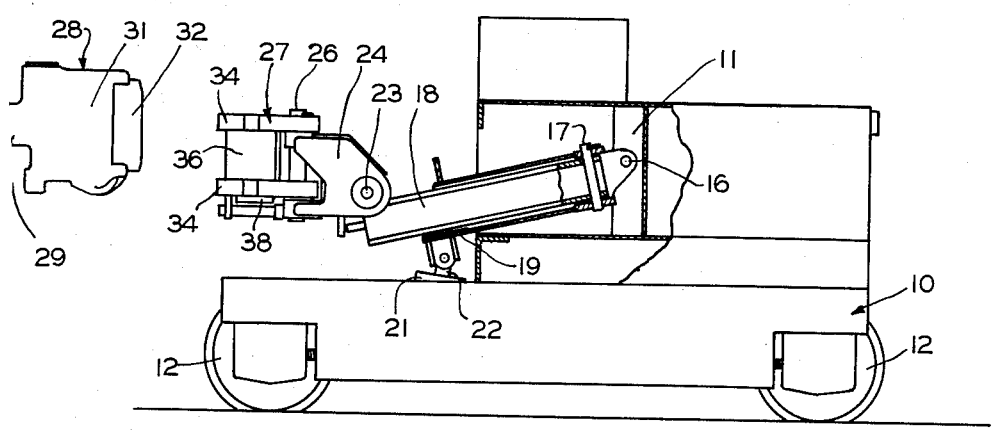
FIG. 2
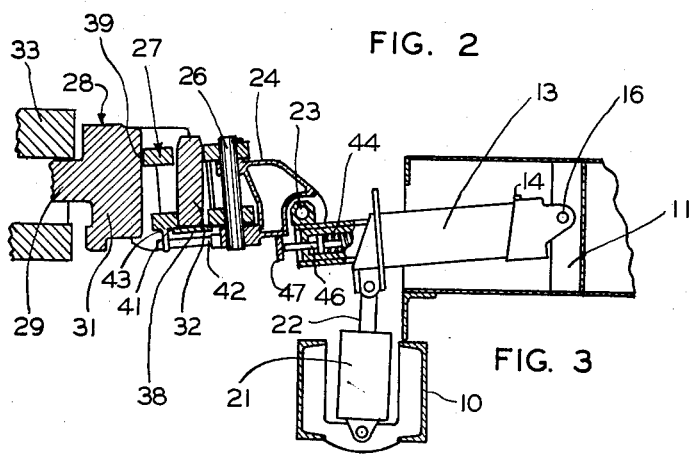
FIG. 3
INVENTOR,
WOODRUFF A. MOREY
BY
HIS ATTORNEY

United States Patent Office 2,722,897
Patented Nov. 8, 1955

2,722,897
RAILWAY VEHICLE COUPLING DEVICE

Woodruff A. Morey, Park Forest, Ill., assignor to Whiting Corporation, a corporation of Illinois Application October 28, 1952, Serial No. 317,315

9 Claims. (Cl. 105—73)

This invention relates generally to rail traction vehicles of the type in which a portion of the weight of a railway car is transferred during operation to the traction vehicle, and relates more specifically to coupling apparatus adapted for use in connection with such traction vehicles.

A primary object of this invention is to provide coupling apparatus for draft engagement with a standard automatic railway car coupler, the apparatus being movable angularly in a generally vertical plane into locking engagement with the car coupler and thereby forming an extension of the car coupler capable of supporting at least a portion of the car's mass.

Another important object of this invention is to provide coupling apparatus of the type described which will permit the negotiation of short radius curves without unduly straining the coupling apparatus.

Additional objects, as well as many of the advantages of this invention, will be disclosed in the course of the following description and in the appended drawings in which:

Fig. 1 is a partial plan view of a preferred form of the coupling apparatus forming the subject matter of this invention;

Fig. 2 is a partial elevation of a rail traction vehicle incorporating this invention and illustrating its disposition prior to coupling with a conventional railway car coupler;

Fig. 3 is a partial cross section through the device illustrated in Fig. 2 illustrating the disposition of the parts when the couplers are engaged and actuated.

A portion of the weight of a railway car may be transferred to a rail traction vehicle by lifting the car coupler. To safely effect this operation, it has been customary to dispose the extremity of the traction vehicle coupler inwardly between the rail wheel axles of the traction vehicle, thus insuring that no overturning movement is inadvertently created. Certain types of railway cars, however, dispose the car wheels in such close proximity to a transverse vertical plane through the car coupler that the wheels of the two vehicles will contact before the couplers can be engaged. The subject coupler utilizes a tongue pivoted to the traction vehicle for movement about both transverse and upright axis, defining in effect a universal joint. A coupler extension is secured to the other end of the vehicle tongue and is also provided with pivot pins disposed on transverse and upright axis. A coupler head for mating engagement with the car coupler constitutes a portion of the extension and is of appreciable depth so that angular movement of the extension in an upright plane will wedge the extension, and particularly the head, into the car coupler, thus making the extension rigid in a vertical plane with respect to the car coupler. This weight transfer is usually accomplished by a jack carried by the traction vehicle and arranged to force the coupler tongue upwardly.

The extension is of such length that its end is disposed between the rail wheel axles of the traction vehicle. This end of the extension defines the point at which the weight of the car is transferred to the vehicle, thus avoiding the generation of a dangerous overturning movement.

The structure briefly described above is highly effective in negotiating traction curves of short radius. As the coupler is raised to transfer weight to the traction vehicle, the tongue of the car coupler is forced firmly against the coupler box through which the tongue projects, thereby restraining the tongue from movement. Since the coupler head of the traction vehicle is free to move in a generally horizontal plane, it is not necessary to move the tongue of the car coupler under most circumstances. The coupling, therefore, defines a free floating link between the traction vehicle and the railway car which is considered essential to the proper negotiation of relatively short radius curves.

Referring to the drawings, Fig. 2 illustrates a traction vehicle having a frame, generally designated 10, including rigid, upwardly extending, laterally spaced members 11. The frame 10 is supported on rail wheels 12 for movement along a conventional track. A coupler box 13 is provided with a pair of rearwardly extending ears 14 pivotally secured by a generally horizontal pin 16 to the upright portions 11 of the frame 10. A generally upright pin 17 extends through the box 13 and pivotally engages a coupler tongue 18 near its inner end. The tongue 18 is thus disposed for angular movement in a generally horizontal plane and is supported during such movement by a pressure plate 19 arranged along the lower lip of the box 13. A hydraulic jack cylinder 21 is pivoted to the frame 10 and provided with an upwardly extending rod 22 pivotally secured to the box 13 in such manner that actuation of the cylinder 21 will force the box 13 and the tongue 18 upwardly about the pivot pin 16. The tongue 18 is, of course, free to move in an arc about the pin 17 regardless of the position of the box 13. A generally horizontal pin 23 is secured near the projecting end of the coupler tongue 18 and pivotally supports an extension arm 24. A generally upright pivot pin 26 carried by the arm 24 pivotally supports a coupler head 27 for mating draft engagement with a conventional automatic railway car coupler, generally designated 28. For convenience, the arm 24, the pin 26, and the head 27 are herein referred to as the "coupler extension."

The coupler 28, as previously noted, is of conventional design, comprising a tongue 29 pivoted to the railway car (not shown) and usually integral with a head 31, which in turn pivotally supports a movable jaw 32. The tongue 29 projects through a coupler box 33 fixed to the railway car. The traction vehicle coupler head 27 may, for example, include a pair of heavy vertically spaced members 34 shaped for coupling engagement with the car coupler 28, and separated by an upright wall 36. The members 34 are cut to define an opening 37 preferably partially closed at the bottom by a jaw supporting plate 38. The curvature of the opening 37 is such as to force the jaw 32 into closed and latched position as the traction vehicle is coupled to the car. In addition, the dimensions of the members 34 and the opening 37 are such that as the coupler head 27, together with the pin 26 and the arm 34, are moved angularly in an upright plane with respect to the car coupler 28, the head 27 will wedge within the coupler 28 by contact at two vertically spaced opposed pressure points, indicated at 39 and 41. When so wedged further upward movement of the pin 23 will not produce further angular movement between the coupler extension and the coupler 28.

Further operation of the jack 21 partially lifts the car by its coupler, the mass being transferred to the traction vehicle in a vertical line extending downwardly through the pin 23, which is, of course, disposed inwardly between the rail wheels 12. The cylinder 21, in moving upwardly, not only effects the transfer of weight between the car and traction vehicle, but also cocks or tilts the coupler extension in the manner described, this action being aided by the jaw support plate 38, which prevents excessive vertical movement between the two coupler heads. To center the coupler head 27 with respect to the arm 24, a leaf spring 42 may be secured at one end of the arm 24 and slidably engage pins 43 fixed to the head 27 near the outer extremity of the spring 24. To facilitate coupling, means are provided for maintaining the coupler extension, including the head 27, in a generally horizontal plane when the rod 22 is retracted into the cylinder 21, thus disposing the tongue 18 at an angle. This is effected by a coil spring 44 disposed within the coupler tongue 18 and acting against an outwardly projecting plunger 46, which in turn bears against an arm 47 depending from arm 24.

In operation, the tongue 18 is lowered to the position indicated in Fig. 2 prior to coupling, the spring 44 maintaining the coupler extension substantially in a horizontal plane. After the coupling has been effected, the cylinder 21 is actuated, thus moving the tongue 18, together with the coupler extension, upwardly. The support plate 38 engages the lower surface of the car coupler jaw 32 causing the coupler extension to pivot about the pin 23 and rigidly wedge itself into the position as shown in Fig. 3. This having been accomplished, further upward movement of the tongue 18 transfers a portion of the weight of the railway car to the traction vehicle, this transfer being effected along a vertical line extending through the pin 23, which is disposed between the rail wheels 12. The traction vehicle coupler head may therefore project outwardly beyond the centerline of the wheels 12 without adverse effect. Uncoupling is, of course, effected by reversal of the above described operations.

When the traction vehicle is in operation, it will be obvious that the car coupler tongue 29 will be forced firmly against the upper inner surface of the coupler box 33 with sufficient force to restrain movement of the tongue 29. In the absence of pin 26, the head 27 should therefore move rotatably with respect to the head 28 during negotiation of a curve in the traction. Usually this rotation can be effected within certain limits by movement of one coupler head with respect to the other but when these limits are exceeded sufficient force must be generated to move the tongue 29 in a horizontal plane. Utilization of the pin 26 largely eliminates the need for exerting such an enormous force and permits the smooth negotiation of curves of relatively short radius. Under such circumstances, it will be noted that the tongue 18, the pin 23, and the arm 24 form, in effect, a floating link restrained from free movement in a horizontal plane only by the edges of the coupler box 13. This floating condition of the tongue 18 results from the use of universal joints at each of the tongue ends, these joints being defined as the pins 16 and 17, and the pins 23 and 26.

The foregoing detailed description illustrates a preferred embodiment of my invention but it should be understood that variation in many of the details described is within the scope of this invention. The invention is, therefore, not limited to these details except insofar as defined in the appended claims.

I claim:

1. Apparatus for coupling a railway vehicle of the type having a coupler tongue pivoted to a vehicle body, a coupler head on the tongue and a movable jaw on said head, to a rail traction vehicle comprising a tongue pivotally secured near its inner end to the traction vehicle, a coupler extension pivoted to the tongue for movement about a generally horizontal axis, said extension including a coupler head shaped for mating engagement with the railway vehicle coupler and defining spaced opposed upper and lower pressure points for locking engagement with the coupler head and coupler jaw, respectively, of the railway vehicle coupler when one end of the traction vehicle coupler extension is moved upwardly, and means on the traction vehicle for forcing the outer end of the tongue upwardly, thereby wedging the coupler head between the coupler head and jaw of the railway vehicle.

2. The structure defined in claim 1 which includes a coupler jaw support carried below and fixed to the coupler head of the traction vehicle.

3. The structure defined in claim 1 in which the coupler extension includes an arm pivoted to the tongue for movement about a horizontal axis, and a coupler head pivoted to the arm for movement about a generally upright axis.

4. The structure defined in claim 3, which includes means disposed between the head and the arm for centering the coupler head with respect to the arm.

5. A coupler for use on a rail traction vehicle having spaced axles comprising a tongue between said axles pivotally secured near one end to the vehicle for movement in both generally horizontal and upright planes, a generally horizontal pivot pin near the other end of the tongue, a rigid extension arm on said pin, an upright pivot pin on the arm, and a coupler head on the upright pin extending outwardly therefrom away from the tongue, said coupler head defining an opening and including a rigid member obstructing the bottom of the opening.

6. The structure defined in claim 5, which includes means carried by the traction vehicle for forcing the coupler tongue upwardly.

7. Coupling apparatus for use on a rail traction vehicle of the type adapted for receiving and supporting a portion of the weight of a railway vehicle through the railway vehicle coupler, said traction vehicle having spaced axles and jack means for forcing the railway vehicle coupler and the traction vehicle coupling apparatus upwardly comprising a rigid tongue, means on one end of the tongue for pivotal attachment to the rail traction vehicle, universal joint means on the opposite end of the rigid tongue, and a coupler head on the universal joint means for mating draft engagement with the railway vehicle coupler, said head including a member disposed for engagement with a lower surface of the railway vehicle coupler when the coupler head on said universal joint is raised thereby wedging the coupler head in the railway vehicle coupler, the length of said rigid tongue being selected to dispose said opposite end of the rigid tongue between the spaced traction vehicle axles.

8. The structure defined in claim 7 wherein said universal joint means comprises a pair of pivot pins disposed transversely to each other and along generally upright and horizontal axes.

9. Apparatus for coupling a railway vehicle to a rail traction vehicle having spaced axles comprising a rigid tongue disposed between said spaced axles, universal joint means on each end of the tongue, one of said joints being secured to the traction vehicle, a coupler head secured to the other of said universal joints and extending therefrom for coupling engagement with said railway vehicle, and means on the traction vehicle for forcing said tongue upwardly.

References Cited in the file of this patent

UNITED STATES PATENTS

| | | |
|---|---|---|
| 553,340 | Heidelberg | Jan. 21, 1896 |
| 655,055 | Butcher | July 31, 1900 |
| 1,755,138 | Stokes | Apr. 15, 1930 |
| 1,989,639 | Keen et al. | Jan. 29, 1935 |
| 2,517,728 | Smith | Aug. 8, 1950 |